United States Patent [19]

Omori

[11] Patent Number: 5,673,122
[45] Date of Patent: Sep. 30, 1997

[54] IMAGE READING APPARATUS INCLUDING SLIT MEMBER DISPOSED BETWEEN FILM ORIGINAL AND READING LENS

[75] Inventor: Toshihiko Omori, Kanagawa-ken, Japan

[73] Assignee: Fuji Photo Film Co., Ltd., Kanagawa, Japan

[21] Appl. No.: 388,469

[22] Filed: Feb. 14, 1995

[30] Foreign Application Priority Data

Feb. 14, 1994 [JP] Japan .................... 6-017420

[51] Int. Cl.⁶ .............. H04N 1/40; H04N 1/04; G02B 26/02; F21V 7/00
[52] U.S. Cl. .............. 358/471; 358/475; 358/484; 358/487; 358/494; 359/232; 355/67; 362/298
[58] Field of Search .............. 358/471, 474, 358/475, 480, 482, 483, 484, 487, 494, 491; 385/147, 901; 250/208.1, 234, 559.02; 359/150, 154, 232, 227; 362/223, 298; 355/228, 229, 67, 70; 382/321

[56] References Cited

U.S. PATENT DOCUMENTS

| | | | |
|---|---|---|---|
| 4,128,332 | 12/1978 | Rowe | 355/67 |
| 4,514,626 | 4/1985 | Tateoka et al. | 358/482 |
| 4,797,711 | 1/1989 | Sasada et al. | 355/32 |
| 5,060,283 | 10/1991 | Shiraishi | 382/321 |
| 5,103,385 | 4/1992 | Federico et al. | 358/491 |
| 5,416,608 | 5/1995 | Ueda et al. | 358/480 |
| 5,499,112 | 3/1996 | Kawai et al. | 358/475 |

FOREIGN PATENT DOCUMENTS

| | | | |
|---|---|---|---|
| 299937 | 4/1990 | Japan | G03B 27/50 |
| 298285 | 4/1990 | Japan | H04N 5/335 |

Primary Examiner—Edward L. Coles, Sr.
Assistant Examiner—Kimberly A. Williams
Attorney, Agent, or Firm—Sughrue, Mion, Zinn, Macpeak & Seas

[57] ABSTRACT

A linear light source having a relatively large numerical aperture emits reading light of a substantially fully diffused light intensity distribution toward a film original that is held between support glass panels. The reading light passes through the film original and then through a slit that is disposed as a field stop between the film original and a reading lens and positioned closely to the film original for limiting a field of view with respect to the reading light. The reading light that has passed through the slit is converged by the reading lens onto CCD line sensors each having the same field of view as that of the slit.

10 Claims, 4 Drawing Sheets

IMAGE READING APPARATUS INCLUDING SLIT MEMBER DISPOSED BETWEEN FILM ORIGINAL AND READING LENS

BACKGROUND OF THE INVENTION

1. Field of the Invention

The present invention relates to an image reading apparatus for reading image information from an original on which the image information is recorded by detecting reading light which carries the image information with photoelectric transducers.

2. Description of the Related Art

Heretofore, there have widely been used image reading apparatus for photoelectrically reading image information recorded on an original such as a photographic film or the like, processing the read image information, and producing film plates for printing or platemaking based on the processed image information.

Such an image reading apparatus (see, for example, Japanese Patent Application Laid-Open Publication Nos. 2-98285 and 2-99937) generally comprises a line sensor as shown in FIG. 5 of the accompanying drawings. As shown in FIG. 5, the image reading apparatus has an elongate light source 2 for illuminating a linear region of the line sensor which extends in the longitudinal direction of the line sensor. Reading light L that is emitted from the light source 2 which is elongate in a direction normal to the sheet of FIG. 5, i.e., in a main scanning direction, is constricted in an auxiliary scanning direction indicated by the arrow X perpendicular to the main scanning direction by a slit member 4. The constricted reading light L is then applied to a film cassette 6. The film cassette 6 comprises a film original F sandwiched between support glass panels 8a, 8b which pass the reading light L therethrough, the film original F bearing image information recorded thereon. The film cassette 6 is fed in the auxiliary scanning direction X. The reading light L which has passed through the film original F in the film cassette 6 and hence carries the image information recorded on the film original F is converged by an optical system comprising a condenser lens 10 onto a line sensor 12 that comprises an array of charge-coupled devices (CCDs) in the main scanning direction. The line sensor 12 converts the applied light L into an electric signal which represents the image information recorded on the film original F.

The film original F is usually in the form of a color reversal film that has a density range from 0 to 4.0. In order to read a high density range highly accurately above the density of 2, it is necessary to keep the level of extraneous light from other than the pixels that have been read by the reading light L to a range of 1/1000 to 1/20000 of the level of the reading light L.

The CCDs of the line sensor 12 have a width corresponding to the width of one pixel which usually ranges from 7 to 10 μm in the auxiliary scanning direction X. If the reading light L entered an area other than the linear region of the line sensor which reads light pixel by pixel, then the image information which is read by the line sensor would suffer flaring and the resulting image would have low quality. The slit member 4 is used to avoid such problems by limiting the width of the reading light L in the auxiliary scanning direction X.

The width of the reading light L for reproducing a high density range highly accurately needs to be determined depending on the size of the CCDs of the line sensor 12 and the optical magnification of the optical system.

The reading light L that has passed through the slit member 4 is limited in its exit direction to a certain range, and hence the numerical aperture (NA) of the line sensor is small in the auxiliary scanning direction X. Consequently, the reading light L that has passed through the slit member 4 is apt to be influenced by a variety of irregularities in the auxiliary scanning direction X. Specifically, if the support glass panels 8a, 8b or the film original F has scratches or carries dust particles, or the support glass panels 8a, 8b are made of nonglare glass, then part of the reading light L is diffused by those scratches or dust particles or the nonglare glass, causing those scratches or dust particles or other irregularities to appear as flaws in the finally produced image.

There has been another practice in which a slit pattern (not shown) is coated on a cover glass layer 14 of the line sensor 12 or positioning a slit member (not shown) in the vicinity of the line sensor 12, with the use of a linear light source having a substantially fully diffused light intensity distribution. In this arrangement, however, if the numerical aperture for the reading light L is increased to prevent the image quality from being lowered due to defects or the like of the film original F, then the reading light L is caused to flare by the lens 10 because the illuminated region on the film original F is increased.

SUMMARY OF THE INVENTION

It is therefore an object of the present invention to provide an image reading apparatus which is of a relatively simple structure and capable of avoiding flaring of light and making scratches, dust particles, or irregularities less influential in a reproduced image thereby to improve the quality of the reproduced image.

According to the present invention, there is provided an image reading apparatus comprising an illuminating system for applying reading light to an original with image information recorded thereon, the illuminating system comprising a linear light source for emitting reading light of a substantially fully diffused light intensity distribution, a condensing optical system for converging the reading light which bears the image information from the original, a slit member positioned between the original and the condensing optical system and disposed closely to the original for controlling a field of view with respect to the reading light from the original, and photoelectric transducer means for detecting and photoelectrically converting the image information borne by the reading light which is converged by the condensing optical system, into an electric signal.

In the image reading apparatus, the illuminating system is a linear light source for emitting reading light of a substantially fully diffused light intensity distribution, and the numerical aperture of the linear light source for the reading light is selected to be relatively large to make scratches, dust particles, or irregularities less influential in the reproduced image, so that the image information recorded on the original can be read highly accurately. The reading light that has passed through the original is constricted in width by the slit member and then applied to the condenser optical system, which converges the reading light onto the photoelectric transducer means for conversion into an electric signal. The condenser optical system is reliably prevented from producing flaring of light, for thereby avoiding a reduction in the quality of an image reproduced from the image information. Thus, the image reading apparatus which is of a relatively simple structure is capable of reproducing images of high quality easily and reliable.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
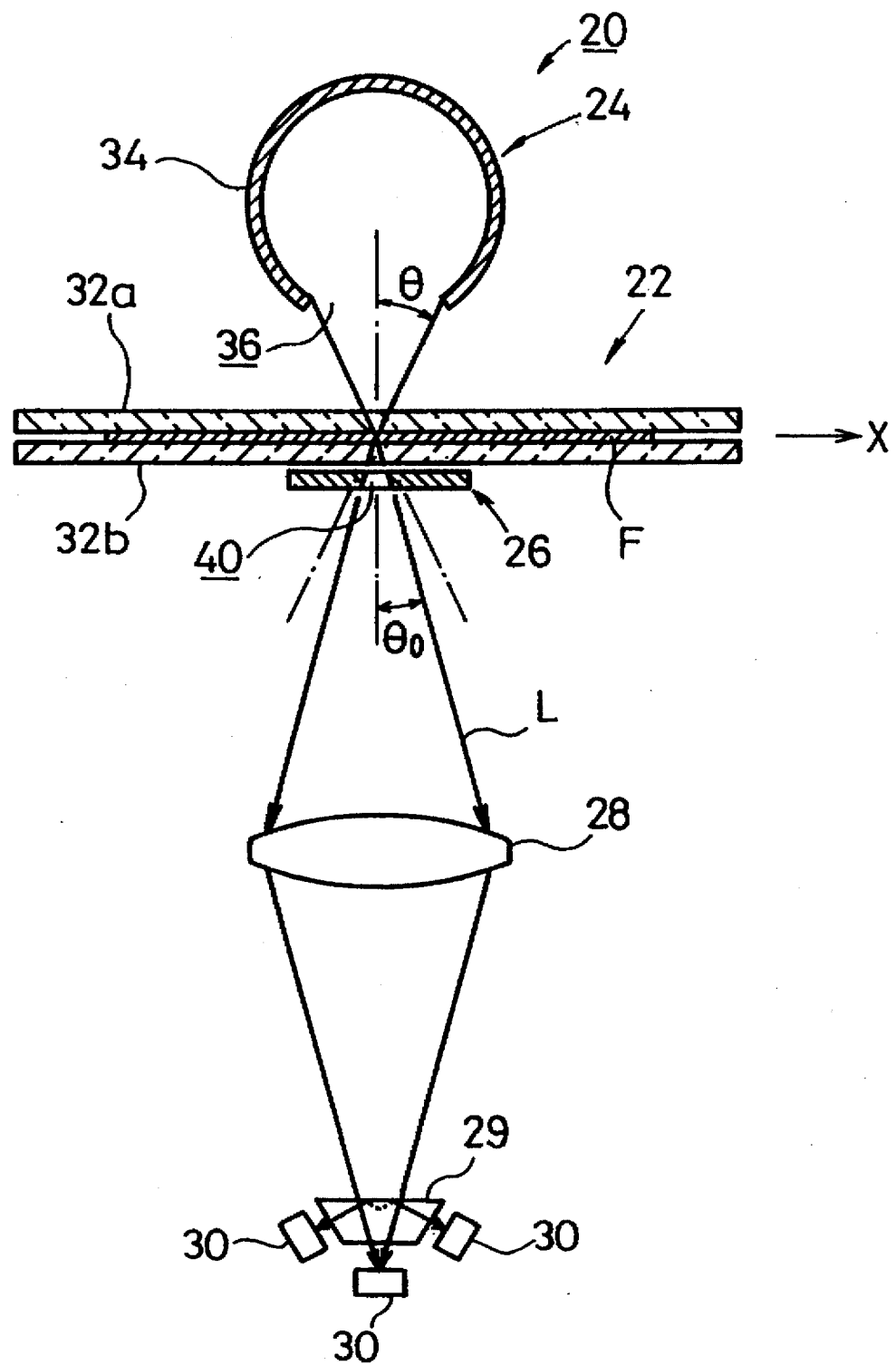
FIG. 1 is a schematic view, partly in cross section, of an image reading apparatus according to the present invention.

As shown in FIG. 1, an image reading apparatus 20 according to the present invention comprises an illuminating system 24 for applying reading light L to a film original F which is held by a cassette 22 and can be fed in an auxiliary scanning direction indicated by the arrow X, a slit member 26, a reading lens (condensing optical system) 28, and a plurality of CCD line sensors (photoelectric transducer means) 30 disposed respectively on separated-light exit sides of a color separating prism 29.

The cassette 22 has two support glass panels 32a, 32b of nonglare glass spaced from each other and sandwiching therebetween the film original F that bears image information recorded thereon. The nonglare glass has its surface roughened to provide surface irregularities in order to prevent Newton's rings from being formed due to multiple reflections between film and glass surfaces. The surface irregularities of generally known nonglare glass have a height ranging from 0.2 to 5 μm and a pitch ranging from 5 to 150 μm.

Figure 2:
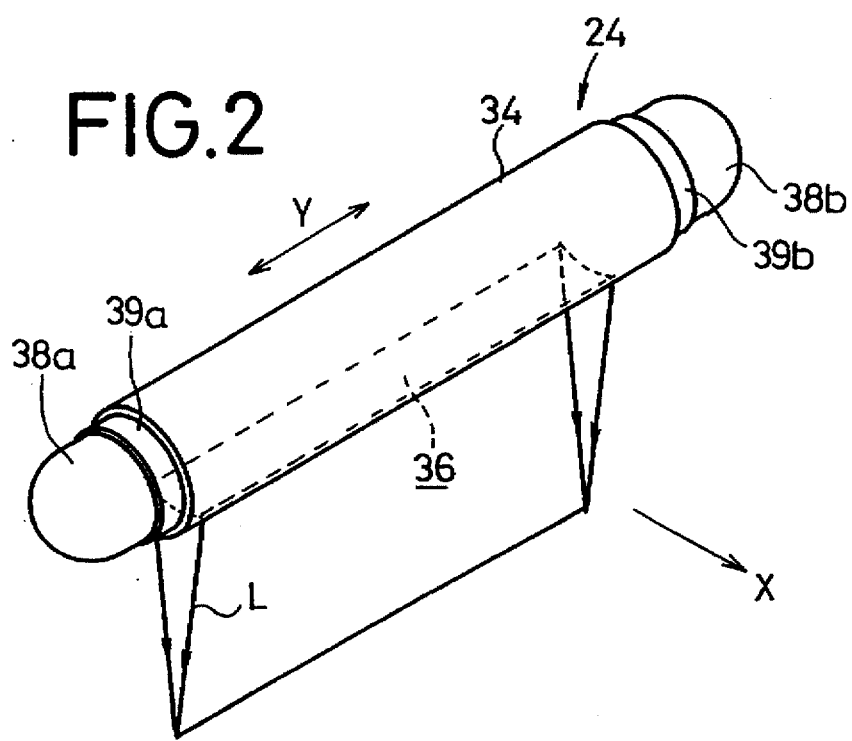
FIG. 2 is a perspective view of an illuminating system of the image reading apparatus shown in FIG. 1.
Figure 3:
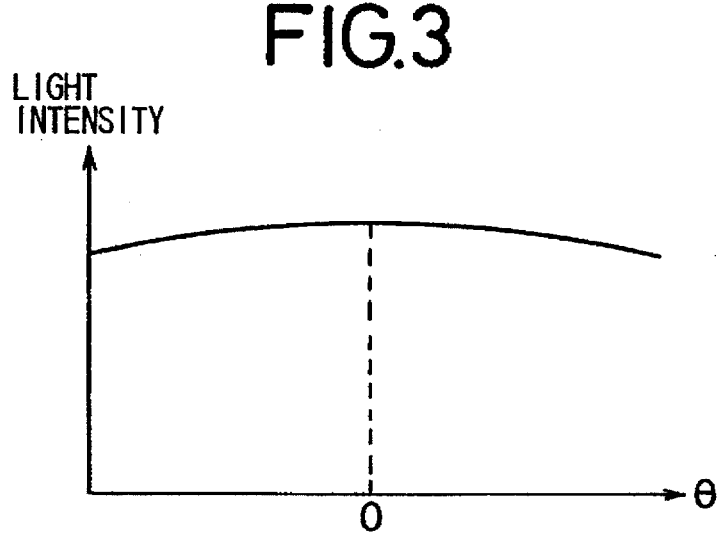
FIG. 3 is a graph showing a fully diffused light intensity distribution of the illuminating system shown in FIG. 2.

As shown in FIG. 2, the illuminating system 24 comprises an elongate tubular casing 34 that is long in a main scanning direction indicated by the arrow Y which is perpendicular to the auxiliary scanning direction X. The tubular casing 34 has an elongate opening or slot 36 defined in a circumferential wall thereof, the slot 36 having a certain width in the auxiliary scanning direction X and extending in the main scanning direction Y. The tubular casing 34 also has a light reflecting film coated on an inner circumferential surface thereof. A pair of halogen lamps 38a, 38b are fixedly mounted respectively on opposite open ends of the tubular casing 34 in axially confronting relation to each other with infrared rejecting filters 39a, 39b interposed between the halogen lamps 38a, 38b and the opposite open ends of the tubular casing 34. The illuminating system 24 of the above structure serves as a linear light source having a substantially fully diffused light intensity distribution, as shown in FIG. 3. The tubular casing 34 has a relatively large numerical aperture NA (=n·sinθ) with respect to the reading light L that is emitted from the tubular casing 34 through the slot 36.

An alternative illuminating system may comprise a halogen lamp 38a and an infrared rejecting filter 39a which are mounted on only one open end of the tubular casing 34, with the other open end thereof being closed by a light reflecting member.

As shown in FIG. 1, the slit member 26 is positioned between the film original F and the reading lens 28, and disposed closely to the film original F, i.e., substantially in contact with the support glass panel 32b of the cassette 22. The slit member 26 has a slit 40 which is elongate in the main scanning direction Y and defined in a light-intransmissible plate between a pair of slanted surfaces that are progressively spread outwardly away from each other in a direction toward the reading lens 28.

Operation of the image reading apparatus 20 will be described below.

When the halogen lamps 38a, 38b of the illuminating system 24 are energized, reading light L which is reflected in various directions by the inner circumferential surface of the tubular casing 34 and has a substantially fully diffused light intensity distribution is emitted from the tubular casing 34 through the slot 36. The reading light L passes through the support glass panel 32a and is converged onto the film original F. Then, the reading light L passes through the film original F, so that it bears the image information recorded on the film original F, and also travels through the support glass plate 32b. Thereafter, the reading light L passes through the slit 40 so as to be guided to the reading lens 28, by which the reading light L is converged onto the line sensors 30. The line sensors 30 convert the image information carried by the reading light L into an electric signal, and transfer the signal as image data to an image processing circuit (not shown).

As described above, the tubular casing 34 has a relatively large numerical aperture NA with respect to the reading light L that is emitted with a substantially fully diffused light intensity distribution from the tubular casing 34 through the slot 36. Therefore, the surface irregularities of the support glass panels 32a, 32b, scratches on the film original F, and dust particles thereon are made less influential in the image data that are generated by the CCD line sensors 30.

The reading light L that has passed through the film original F is constricted in width by the slit 40 in the slit member 26, and then guided to the reading lens 28. Therefore, the slit member 26 is as effective as a field stop to limit the field of view with respect to the reading light L, thereby avoiding flaring of light in the reading lens 28 and also the line sensors 30. Flaring of light is also avoided in the color separating prism 29 or any other color separating system such as filters or the like.

The image data generated by the line sensors 30 are therefore reliably and easily made less susceptible to the surface irregularities of the support glass panels 32a, 32b, scratches on the film original F, dust particles thereon, and also flaring of light, and images of high quality can be reproduced from the image data. The overall arrangement of the image reading apparatus 20 is simple because it is composed of only the illuminating system 24, the slit member 26, the reading lens 28, and the line sensors 30.

In the illustrated embodiment, the slit 40 in the slit member 26 is defined in a light-intransmissible plate between a pair of slanted surfaces that are progressively spread outwardly away from each other in a direction toward the reading lens 28. However, the slit 40 may be of any configuration insofar as the reading light L passing through the slit 40 is not reflected by the edges of the slit 40 or is prevented from leaking toward the reading lens 28 even when the light L is reflected by the edges of the slit 40.

Figure 6:
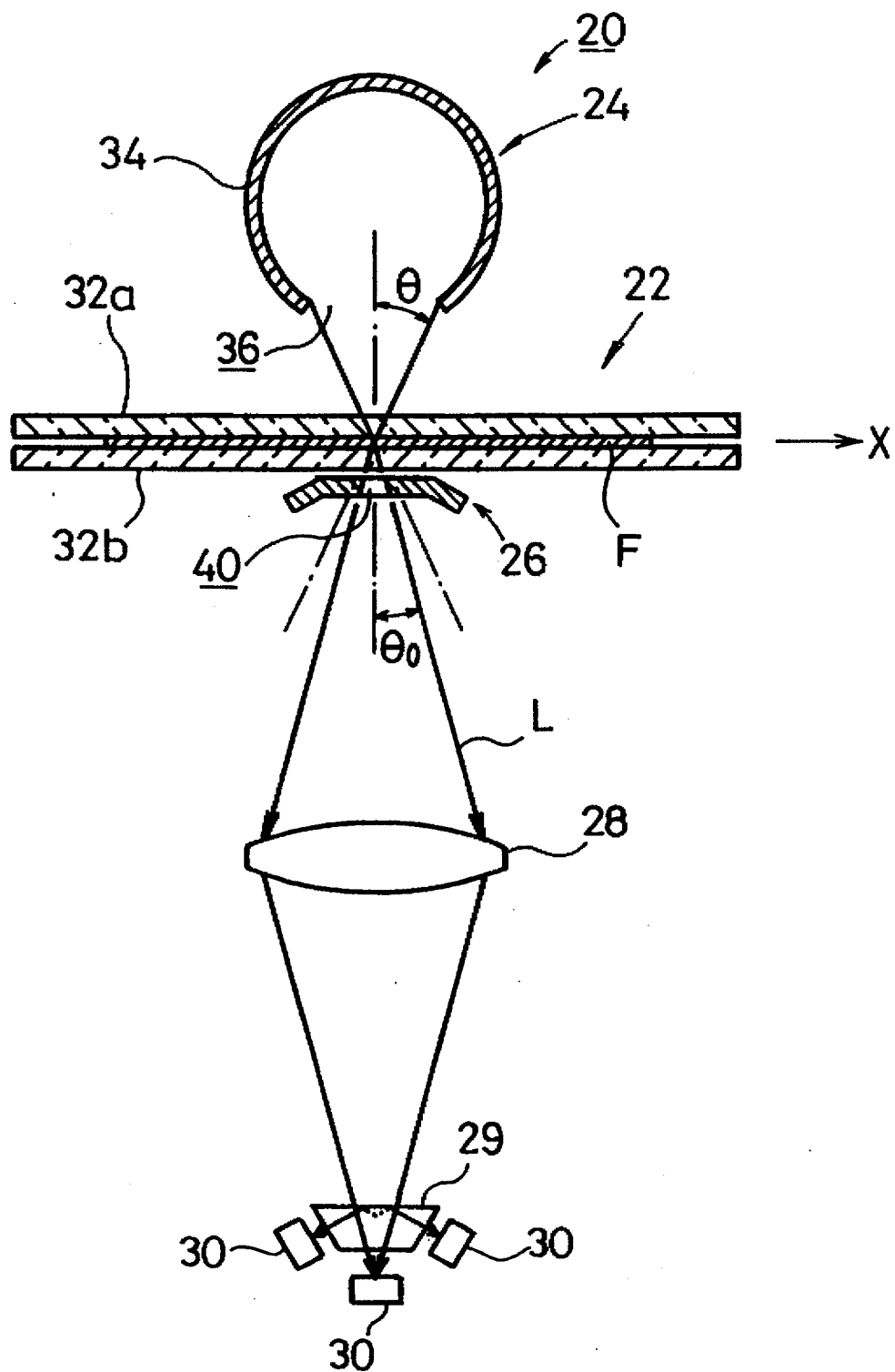
FIG. 6 is a schematic view of the image reading apparatus shown in FIG. 1 in which the light-intransmissible plate of the slit member is tilted downward at both edge portions thereof on both sides of the slit.

It is also important to prevent the light L from being reflected back to the film original F by the surface of the slit member 26 opposite to the film original F. An idea to prevent the light L from being reflected back is to tilt down edge portions of the slit member 26 on both sides of the slit 40, as shown in FIG. 6, thereby to avoid the stray light having adverse effects.

Figure 4:
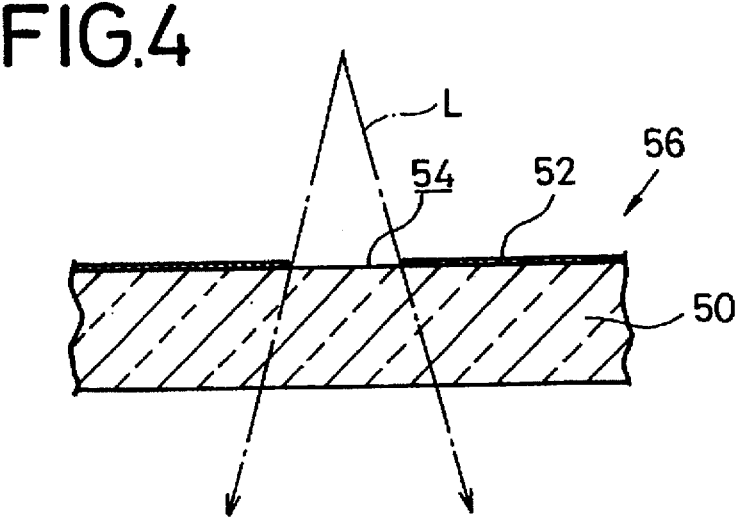
FIG. 4 is an enlarged fragmentary cross-sectional view of another slit member that can be used in the image reading apparatus.
Figure 5:
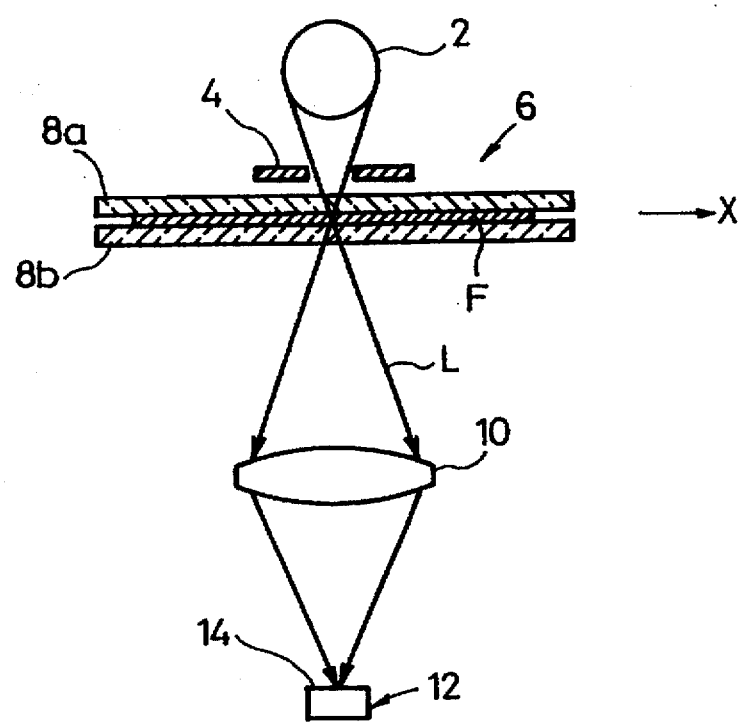
FIG. 5 is a schematic view, partly in cross section, of a conventional image reading apparatus.

FIG. 4 shows another slit member 56 that can be used in the image reading apparatus 20. As shown in FIG. 4, the slit member 56 comprises a glass plate 50, rather than a light-intransmissible plate, and a chromium-evaporated layer 52 deposited on one surface of the glass plate 50 and having a slit 54 for allowing reading light L to pass therethrough. The slit 54 is produced by peeling off a portion of the chromium-evaporated layer 52 from the glass plate 50.

Although certain preferred embodiments of the present invention has been shown and described in detail, it should be understood that various changes and modifications may be made therein without departing from the scope of the appended claims.

What is claimed is:

1. An image reading apparatus comprising:

an illuminating system for applying reading light to an original with image information recorded thereon, said illuminating system comprising a linear light source for emitting reading light of a substantially fully diffused light intensity distribution;

a condensing optical system for converging the reading light which bears the image information from the original;

a slit member positioned between said original and said condensing optical system and disposed closely to said original for controlling a field of view with respect to the reading light from said original; and photoelectric transducer means for detecting and photoelectrically converting the image information borne by the reading light which is converged by said condensing optical system, into an electric signal, said condensing optical system being positioned between said slit member and said photoelectric transducer means.

2. An image reading apparatus according to claim 1, wherein said linear light source comprises:

a tubular casing having a slot defined in a circumferential wall thereof, said slot having a predetermined width in a circumferential direction of said tubular casing and extending in an axial direction of said tubular casing, said tubular casing having a light reflecting film disposed on an inner circumferential surface thereof; and a pair of lamps fixedly mounted on respective opposite open ends of said tubular casing in axially confronting relation to each other.

3. An image reading apparatus according to claim 1, wherein said slit member comprises a light-intransmissible plate with a slit defined therein.

4. An image reading apparatus according to claim 1, wherein said slit member has a slit which is elongated in a main scanning direction and defined between a pair of slanted surfaces that are progressively spread outwardly away from each other in a direction toward said condensing optical system.

5. An image reading apparatus comprising:

an illuminating system for applying reading light to an original with image information recorded thereon, said illuminating system comprising a linear light source for emitting reading light of a substantially fully diffused light intensity distribution;

a condensing optical system for converging the reading light which bears the image information from the original;

a slit member positioned between said original and said condensing optical system and disposed closely to said original for controlling a field of view with respect to the reading light from said original, said slit member comprising a light-intransmissible plate with a slit defined therein; and photoelectric transducer means for detecting and photoelectrically converting the image information borne by the reading light which is converged by said condensing optical system, into an electric signal.

6. An image reading apparatus comprising:

an illuminating system for applying reading light to an original with image information recorded thereon, said illuminating system comprising a linear light source for emitting reading light of a substantially fully diffused light intensity distribution;

a condensing optical system for converging the reading light which bears the image information from the original;

a slit member positioned between said original and said condensing optical system and disposed closely to said original for controlling a field of view with respect to the reading light from said original, said slit member comprising a light-intransmissible plate with a slit defined therein, said light-intransmissible plate of the slit member being tilted downwardly at both edge portions thereof on both sides of the slit; and photoelectric transducer means for detecting and photoelectrically converting the image information borne by the reading light which is converged by said condensing optical system, into an electric signal.

7. An image reading apparatus comprising:

an illuminating system for applying reading light to an original with image information recorded thereon, said illuminating system comprising a linear light source for emitting reading light of a substantially fully diffused light intensity distribution;

a condensing optical system for converging the reading light which bears the image information from the original;

a slit member positioned between said original and said condensing optical system and disposed closely to said original for controlling a field of view with respect to the reading light from said original, said slit member comprising a glass plate and a light shield layer evaporated on a surface of said glass plate, said light shield layer having a slit produced by peeling off a portion of the light shield layer from said glass plate; and photoelectric transducer means for detecting and photoelectrically converting the image information borne by the reading light which is converged by said condensing optical system, into an electric signal.

8. An image reading apparatus comprising:

an illuminating system for applying reading light to an original with image information recorded thereon, said illuminating system comprising a linear light source for emitting reading light of a substantially fully diffused light intensity distribution;

a condensing optical system for converging the reading light which bears the image information from the original;

a slit member positioned between said original and said condensing optical system and disposed closely to said original for controlling a field of view with respect to the reading light from said original; and photoelectric transducer means for detecting and photoelectrically converting the image information borne by the reading light which is converged by said condensing optical system, into an electric signal, said condensing optical system being positioned between said slit member and said photoelectric transducer means, wherein said linear light source is of a unitary construction which comprises:

a tubular casing having a slot defined in a circumferential wall thereof, said slot having a predetermined width in a circumferential direction of said tubular casing and extending in an axial direction of said tubular casing, said tubular casing having a light reflecting film disposed on an inner circumferential surface thereof; and a pair of lamps fixedly mounted on respective opposite open ends of said tubular casing in axially confronting relation to each other.

9. An image reading apparatus according to claim 8, wherein said linear light source further comprises an infrared rejecting filter interposed between each of said lamps and the respective opposite open ends of said tubular casing.

10. An image reading apparatus comprising:

an illuminating system for applying reading light to an original with image information recorded thereon, said illuminating system comprising a linear light source for emitting reading light of a substantially fully diffused light intensity distribution;

a condensing optical system for converging the reading light which bears the image information from the original;

a slit member positioned between said original and said condensing optical system and disposed closely to said original for controlling a field of view with respect to the reading light from said original, said slit member having a slit which is elongated in a main scanning direction and defined between a pair of slanted surfaces that are progressively spread outwardly away from each other in a direction toward said condensing optical system; and photoelectric transducer means for detecting and photoelectrically converting the image information borne by the reading light which is converged by said condensing optical system, into an electric signal.

* * * * *